Patented Nov. 25, 1924.

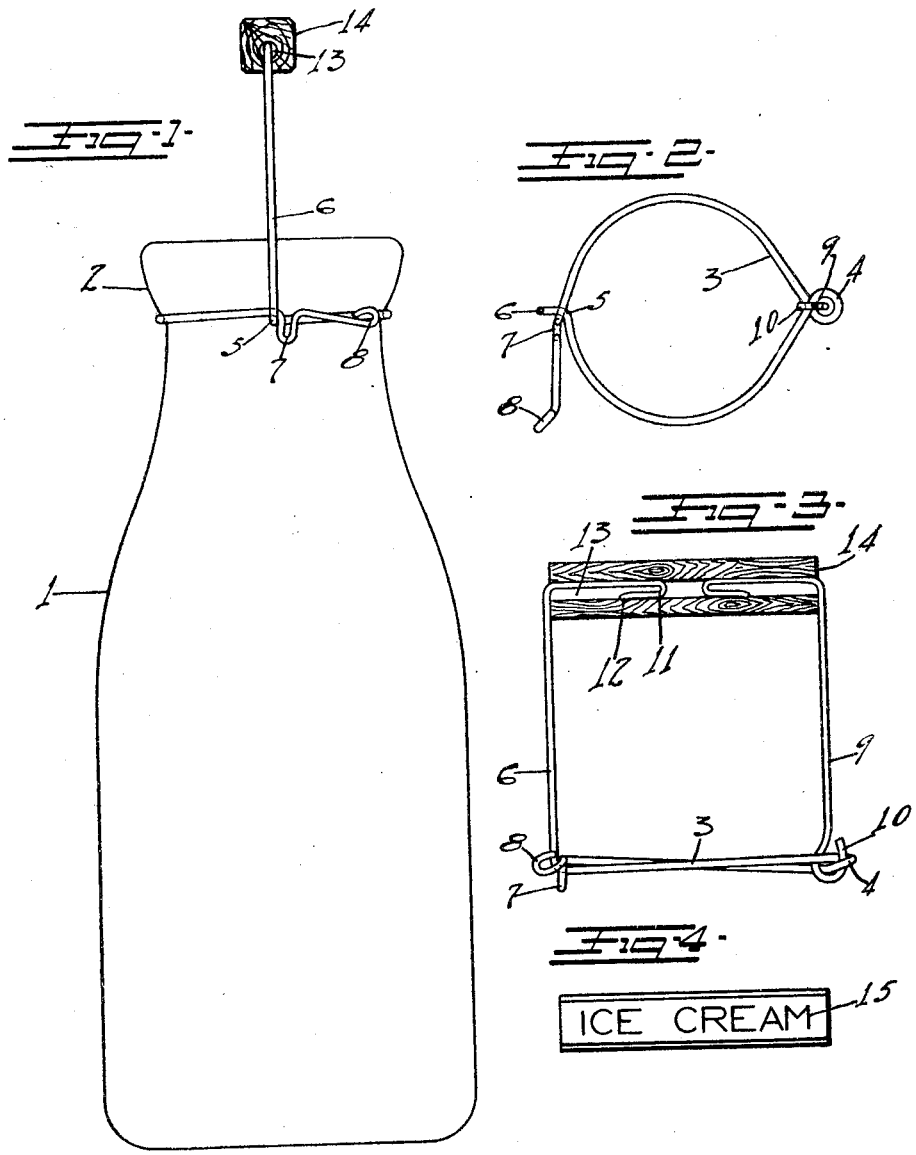

1,516,956

UNITED STATES PATENT OFFICE.

GEORGE H. DAVIE, OF ERIE, PENNSYLVANIA, ASSIGNOR OF ONE-HALF TO CHARLES A. MASSING, OF MILLCREEK TOWNSHIP, PENNSYLVANIA.

BOTTLE CARRIER.

Application filed October 12, 1922. Serial No. 594,121.

*To all whom it may concern:*

Be it known that I, GEORGE H. DAVIE, a citizen of the United States, residing at Erie, in the county of Erie and State of Pennsylvania, have invented new and useful Improvements in Bottle Carriers, of which the following is a specification.

This invention is designed to provide a convenient means for carrying receptacles and is preferably so arranged that the means may serve as an advertisement.

The invention is illustrated in the accompanying drawings as follows:—

Fig. 1 shows a side elevation of the receptacle with the device in place.

Fig. 2 a plan view of the securing ring.

Fig. 3 a side elevation of the carrier.

Fig. 4 a side elevation of the handle showing the advertising thereon.

1 marks the bottle having the usual shoulder 2 at its upper edge.

The carrier is formed with a ring 3 terminating with a loop 4 at one side, the ring being normally tensioned so that it will spring open to permit of its placing over the shoulder 2. The ring is parted opposite the loop 4 and one end has an outwardly bent portion 5 with an up-turned bail 6 and the opposite end has a downwardly bent hook 7 with a handle 8 extending therefrom. The upwardly extending bail portion 9 has a loop 10 at its lower end which is locked in the loop 4.

The bail portions 9 and 6 are bent inwardly at their upper ends and terminate in return bends 11 forming an engaging point 12 which operates in the manner of a harpoon in the walls of an opening 13 in a handle 14. All that is necessary to assemble it, therefore, is to crowd the handle on to the bent ends and the point 12 prevents the disengagement and prevents the handle from turning.

The handle is preferably made rectangular in cross section making the flat sides on which the advertising material as indicated at 15 may be placed.

In the operation of the device the hook 7 is disengaged, the ring springs up and can be put in place by crowding the hook 7 by means of the handle 8 over the out-bend 5. The ring 3 may be locked under the shoulder thus making a perfect carrier for the receptacle.

What I claim as new is:—

1. In a bottle carrier, the combination of a wire split ring having one end extended to form one end of a bail and the opposite end of the split ring in the form of a catch to close the ring under a shoulder on a bottle; and means completing the bail and securing the opposite end thereof to the opposite side of the ring from the catch.

2. In a bottle carrier, the combination of a wire split ring having a loop at one side and one end of the ring extended to form one end of a bail, the opposite end of the split ring being arranged in the form of a catch to close the ring under a shoulder on a bottom; and means completing the bail secured to the loop.

3. In a bottle carrier, the combination of a means adapted to engage a bail; a bail secured to said means comprising a handle having perforations in its ends; and a wire bail having portions extending into the perforations, the ends of the portions extending into the perforations having return bends, the ends of which engage the walls of the perforations preventing the withdrawal of the bail from the handle.

4. In a bottle carrier, the combination of a split ring; a catch adapted to hold the ring in closed position; and a bail comprising a handle having perforations in its end and wire portions extending from the ring and into the perforations, the ends of the wire in the perforations having return bends engaging the walls of the perforations.

In testimony whereof I have hereunto set my hand.

GEORGE H. DAVIE.